United States Patent
Fry et al.

(10) Patent No.: US 8,271,641 B2
(45) Date of Patent: Sep. 18, 2012

(54) METHOD AND SYSTEM FOR GOVERNING RESOURCE CONSUMPTION IN A MULTI-TENANT SYSTEM

(75) Inventors: Chris Fry, Berkeley, CA (US); Peter Morreli, San Francisco, CA (US); Craig Weissman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 1169 days.

(21) Appl. No.: 11/616,657

(22) Filed: Dec. 27, 2006

(65) Prior Publication Data

US 2008/0086479 A1 Apr. 10, 2008

Related U.S. Application Data

(60) Provisional application No. 60/850,863, filed on Oct. 10, 2006, provisional application No. 60/828,757, filed on Oct. 9, 2006, provisional application No. 60/828,192, filed on Oct. 4, 2006.

(51) Int. Cl.
 *G06F 15/173* (2006.01)
(52) U.S. Cl. ........ 709/224; 709/223; 709/235; 707/636; 707/688; 707/705; 707/737; 707/769
(58) Field of Classification Search .................. 709/223, 709/235, 224; 707/10, 636, 688, 705, 737, 707/769
See application file for complete search history.

(56) References Cited

U.S. PATENT DOCUMENTS

| | | | | |
|---|---|---|---|---|
| 6,560,717 | B1 * | 5/2003 | Scott et al. | 714/4 |
| 6,851,062 | B2 * | 2/2005 | Hartmann et al. | 726/22 |
| 7,007,299 | B2 * | 2/2006 | Ioele et al. | 726/14 |
| 7,069,267 | B2 * | 6/2006 | Spencer, Jr. | 1/1 |
| 7,734,608 | B2 * | 6/2010 | Fell et al. | 707/705 |
| 2003/0046396 | A1 * | 3/2003 | Richter et al. | 709/226 |

* cited by examiner

*Primary Examiner* — Haresh N Patel
*Assistant Examiner* — Mohammad Siddiqi
(74) *Attorney, Agent, or Firm* — Daryl C. Josephson

(57) ABSTRACT

A database system includes servers configured to receive requests from user systems. Each server includes a local and a global store. Each local store stores the number of requests received by its server. The system includes a processor configured to receive the number of requests from servers. The processor is configured to determine the number of requests received by all of the servers, and send this number of requests to each server. The global store stores the number of requests received from the processor. A given server is configured to compare the number of requests received by the servers with a threshold number. If this number is greater than the threshold number, then the given server is configured to send a message to the user systems that the number of threshold requests has been exceeded and/or the given server will discontinue accepting requests.

12 Claims, 7 Drawing Sheets

METHOD AND SYSTEM FOR GOVERNING RESOURCE CONSUMPTION IN A MULTI-TENANT SYSTEM

This application claims the benefit of the following U.S. Provisional Patent Applications, the entire contents of which are incorporated herein by reference:
1. U.S. Provisional Patent Application 60/850,863 entitled METHOD AND SYSTEM FOR GOVERNING RESOURCE CONSUMPTION IN A MULTI-TENANT SYSTEM, by Chris Fry et al., filed Oct. 9, 2006;
2. U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006; and
3. U.S. Provisional Patent Application 60/828,757 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 9, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to database systems, and more particularly to a methods and systems for governing resource consumption in a multi-tenant system.

BACKGROUND

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid retrieval of accurate information and subsequent delivery of this information to the user system has been and continues to be a goal of administrators of database systems.

Unfortunately, conventional database systems might process a query relatively slowly if, for example, the number of queries received by the database system is relatively high. A database system may also process a query relatively slowly if, for example, a relatively large number of users substantially concurrently access the database system.

Accordingly, it is desirable to provide techniques enabling tracking of use of the database system, and/or limiting the use of the system to improve performance of the database system.

BRIEF SUMMARY

In accordance with embodiments, there are provided a multi-tenant database system and a method of governing resource consumption therein. These systems and methods for governing resource consumption in a multi-tenant database can enable tracking and managing access to the multi-tenant database system. The ability of embodiments to provide tracking and managing access can enable improved performance of the database system.

In an embodiment and by way of example, a method for governing resource consumption is provided. One method embodiment includes receiving at a platform onto which applications can be built by third parties, at least one programming language instruction. Based on the at least one programming language instruction, a set of instructions to an on demand database service is prepared. It may be determined from comparison of a number of requests made of the on demand database service and a resource limit whether to apply the set of instructions to the on demand database service to affect a result in accordance with the programming language instruction. Specific embodiments can support multi-tenant database architectures. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

According to one embodiment, the multi-tenant database system includes a plurality of application servers configured to receive requests from a set of user systems of a set of users of a tenant. Each of the application servers includes a local store and a global store. Each of the local stores is configured to store the number of requests received by the application server associated with the local store. The system further includes a processor configured to receive from the application servers the number of requests received by each of the application servers. The processor is configured to determine the number of requests received by all of the application servers, and send the number of requests received by all the application servers to each of the application servers. The global store of each of the application servers is configured to store the number of requests received by each of the other application servers or the number of requests received by all of the application servers. At least a given one of the application server is configured to compare the number of requests received by the plurality of application servers with a threshold number of requests. If the number of requests received by the plurality of application servers is greater than the threshold number of requests, then the given application server is configured to send a message to the user systems in communication with the given application server that the number of threshold requests has been exceeded and/or discontinue accepting requests from the user systems in communication with the given application server.

According to a specific embodiment, the system further includes a network configured to communicatively couple the application servers and the processor. If the network fails between the given application server and the processor, then the given application server is configured to compare the number of requests received that is stored in the given application server's local store with the threshold number of requests. If the number of requests received by the given application server is greater than the threshold number of requests, then the given application server is configured to send a message to the user systems in communication with the given application server that the number of threshold requests has been exceeded and/or discontinue accepting requests from the user systems in communication with the given application server.

The number of requests may be for requests received over a period of time, and the period of time is thirty minutes or longer. The number of requests may be for current requests that are pending.

According to another embodiment, an operation method of multi-tenant database system includes receiving at a plurality of application servers requests from a set of user systems of a set of users of a tenant. Each of the application servers includes a local store and a global store. The method further includes storing a number of requests received by each application server in a local store of each application server associated with the local store, and transferring the number of requests received by each application server to a processor. The method further includes determining in the processor the number of requests received by all of the application servers, and sending the number of requests received by all the application servers to each of the application servers. The method further includes storing in a global store of each of the application servers the number of requests received by each of the other application servers or the number of requests received by each of the application servers; and comparing in a given one of the application servers the number of requests received by the plurality of application servers with a threshold number of requests. If the number of requests received by the plurality of application servers is greater than the threshold number of requests, sending from the given application server to the user systems in communication with the given application server a message that indicates that the number of threshold requests has been exceeded and/or discontinue accepting requests from the user systems in communication with the given application server.

According to a specific embodiment, if a network connection between the application servers and the processor fails, comparing in the given application server the number of requests received that is stored in the given application server's local store with the threshold number of requests. If the number of requests received that is stored in local store of the given application server is greater than the threshold number of requests, sending a message from the given application to the user systems in communication with the given application server that the number of threshold requests has been exceeded and/or discontinuing the acceptance requests from the user systems in communication with the given application server.

According to another embodiment, the multi-tenant database system includes a plurality of application servers configured to receive requests from a set of user systems of a set of users of a tenant. Each of the application servers includes a local store and a global store. Each of the local stores is configured to store metadata for the requests. The metadata for each request represents an amount of database access associated with the request. The system further includes a processor configured to receive from the application servers the metadata for the requests. The processor is configured to accumulate the metadata and send the accumulated metadata to each of the application servers. The global store of each of the application servers is configured to store metadata received from the processor. At least a given one of the application servers is configured to determine from the received metadata an amount of database access and compare the amount of database access to a threshold amount of database access for the tenant. If the amount of database access associated with the received metadata exceeds a threshold amount of database access, then the given application server is configured to send a message to the user systems in communication with the given application server that the user systems have requested an amount of database access that exceeds an amount permitted for the tenant and/or discontinue accepting requests from the user systems in communication with the application server.

According to a specific embodiment, the system further includes a network configured to communicatively couple the application servers and the processor. If the network fails between the given application server and the processor, then the given application server is configured to determine from the metadata in the local store of the given application server another amount of database access. If the other amount of database access exceeds a threshold amount of database access, then the given application server is configured to send a message to the user systems in communication with the given application server that these user systems have requested an amount of database access that exceeds an amount permitted for the tenant and/or discontinue accepting requests from these user systems in communication with the application server.

A multi-tenant database system according to another embodiment includes a server configured to receive a request for database access from a user system of a user. The request is associated with a first database access efficiency. The server is configured to generate a filtered request based on the request. The filtered request is associated with a second database access efficiency, and the second database access efficiency is greater than first database access efficiency.

According to a specific embodiment, a filter associated with the filtered request is a geographical filter, a data volume filter, and/or a semantic filter. The geographical filter may be configured to filter data in the database based on a geographical association of the data. The data volume filter may be configured to limit a number of rows, and/or columns in a database the request is permitted to access. The semantic filter may be configured to modify a search string of the request.

According to another embodiment, an operation method of multi-tenant database system includes at an application server receiving from a user systems of a user a request for database access, wherein the request is associated with a first database access efficiency. The method further includes generating at the application server a filtered request based on the request, wherein the filtered request is associated with a second database access efficiency, and the second database access efficiency is greater than first database access efficiency. The method further includes issuing the filtered request to a database. The database may responds to request in by providing data, modifying data in the database, and/or adding data to the database. A filter associated with the filtered request is a geographical filter, a data volume filter, and/or a semantic filter.

A multi-tenant database system according to another embodiment includes an application server configured to receive computer code from a user system of a user of a tenant. The computer code is received in a format that is transportable over a network. The server is configured to compile and run the computer code. The system further includes a database configured to be accessed by the application server running the computer code. The application server is configured to monitor an amount of database access requested by the computer code running on the application server. If the amount of database access exceeds a threshold amount of database access, then the application server is configured to send a message to a user system in communication with the application server that the code has requested an amount of database access that exceeds an amount permitted for the computer code and/or discontinue issuing requests to the database.

According to a specific embodiment, the system further includes a network configured to communicatively couple the application server and a user system from which the code is received. The network may be the Internet, and the format may be the format of extensible markup language.

According to another embodiment, the amount of database access the application server running the computer code is permitted to access is based on a status of the user, the tenant, a type of the computer code, and/or an environment of the user system by which the code is requested to be run. The user system may configured to display a user interface, the computer code may be executed via a selection of a graphical object on the user interface, and the amount of database access is based on a single request that the code is permitted by the application server to issue to the database. The graphical object may be a screen button. The amount of database access may be associated with a number of rows and/or a number of columns requested for access. The application server may be configured to count a number of requests the running code issues to the database, and the amount of database access is based on the number of requests.

According to another embodiment, an operation method of multi-tenant database system includes at an application server, receiving computer code from a user system of a user of a tenant. The computer code is received in a format that is transportable over a network. The method further includes at the application server, compiling the computer code, and running the computer code. The method further includes via the application server running the code, accessing a database. The method further includes at the application server, monitoring an amount of database access requested by the computer code running on the application server. If the amount of database access exceeds a threshold amount of database access, sending a message from the application server to a user system that is in communication with the given application server that the code has requested an amount of database access that exceeds an amount permitted for the computer code and/or discontinue accepting requests from the application server running the code. According to a specific embodiment, the amount of database access the application server running the computer code is permitted to access is based on a status of the user, the tenant, a type of the computer code, and/or an operation environment of the user system by which the code is requested to be run.

A better understanding of the nature and advantages of the many embodiments may be gained with reference to the following detailed description and the accompanying drawings.

DETAILED DESCRIPTION

Embodiments provide mechanisms and methods of managing resource consumption placed upon an on demand service by requests made by users, user programs, or non-human users in various configurations. In a multi-tenant database system, a multi-tenant architecture is used wherein customer organizations (i.e., tenants) share database resources in one logical database. A tenant of the system typically retrieves data from and stores data on the system using the tenant's user systems. A user system might remotely access one of a plurality of server system that might in turn access the multi-tenant database system. Data retrieval from the system might include the issuance of a query from the user system to the multi-tenant database system. The multi-tenant database system might process the request for information received in the query and send to the user system information relevant to the request. The rapid retrieval of accurate information and subsequent delivery of this information to the user system has been and continues to be a goal of administrators of multi-tenant database systems. A multi-tenant database system might process a query relatively slowly if, for example, the number of queries received by the multi-tenant database system is relatively high. A multi-tenant database system may also process a query relatively slowly if, for example, a relatively large number of users of a tenant substantially concurrently access the multi-tenant database system.

System Overview

Figure 1:
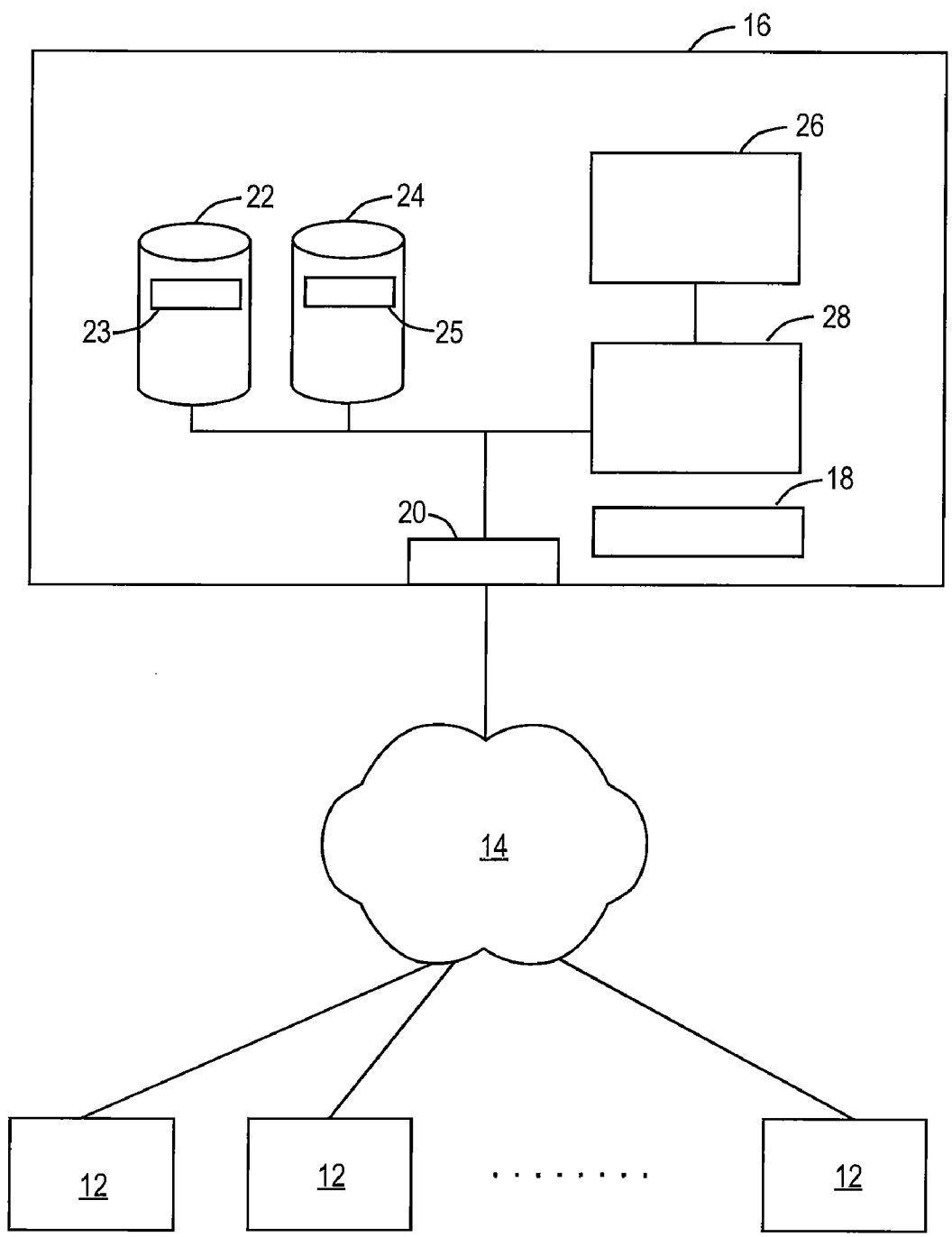
FIG. 1 illustrates an environment where a multi-tenant database system may be used according to one embodiment.

FIG. 1 illustrates an environment where a multi-tenant database system might be used. As illustrated in FIG. 1 (and in more detail in FIG. 2) any user system 12 might interact via a network 14 with an on-demand database service 16. Some on-demand database services may store information from one or more tenants stored into tables of a common database image to form a multi-tenant database system (MTS). Accordingly, on-demand database service 16 and System 16 will be used interchangeably herein. A database image may include one or more database objects. A relational database management system (RDMS) or the equivalent may execute storage and retrieval of information against the database object(s). Some on-demand database services may include an application platform 18 that enables creation, managing and executing one or more applications developed by the provider of the on-demand database service, users accessing the on-demand database service via user systems 12, or third party application developers accessing the on-demand database service via user systems 12.

The users of those user systems 12 might be users in differing capacities and the capacity of a particular user system 12 might be entirely determined by the current user. For example, where a salesperson is using a particular user system 12 to interact with System 16, that user system has the capacities allotted to that salesperson. However, while an administrator is using that user system 12 to interact with System 16, that user system has the capacities allotted to that administrator. In systems with an hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" that will be used in many of the examples herein. It should be understood, however, that the networks that the present invention might use networks other than the Internet.

User systems 12 might communicate with System 16 using TCP/IP and, at a higher network level, use other common Internet protocols to communicate, such as HTTP, FTP, AFS, WAP, etc. As an example, where HTTP is used, a user system 12 might include an HTTP client commonly referred to as a "browser" for sending and receiving HTTP messages from an HTTP server at System 16. Such an HTTP server might be implemented as the sole network interface between System 16 and network 14, but other techniques might be used as well or instead. In some embodiments, the interface between System 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS's data; however, other alternative configurations are contemplated.

In some embodiments, the system shown in FIG. 1 implements a web-based customer relationship management (CRM) system. For example, System 16 may include application servers configured to implement and execute CRM software applications as well as provide related data, code, forms, web pages and other information to user systems 12 and to store to, and retrieve from, a database system related data, objects and web page content. With a multi-tenant system, data for multiple tenants may be stored in the same physical database object, however, tenant data typically is arranged so that data of one tenant is kept logically separate from that of other tenants so that one tenant does not have access to another's data, unless such data is expressly shared. In certain aspects, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of System 16 is shown in FIG. 1, including a network interface 20, a storage 22 for tenant data 23, a storage 24 for system data 25 (accessible to System 16 and possibly multiple tenants), program code 26 for implementing various functions of System 16, and a set of processors 28 for executing MTS system processes and tenant-specific processes, such as running applications as part of an application hosting service. A set as referred to herein may include one or more elements. The set of processors 28 may be or may form portions of various server systems or the like that are configured to access storage 22 and/or storage 24. Additional processes that may execute on System 16 include database indexing processes.

Several elements in the system shown in FIG. 1 include conventional, well-known elements that are explained briefly. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system, such as a human user) of user system 12 to access, process and view information and pages available to it from System 16 over network 14. Each user system 12 also typically includes one or more user interface devices, such as a keyboard, a mouse, a touch screen, a pen or the like, for interacting with a graphical user interface (GUI) provided by the browser on a display (e.g., monitor screen, LCD display, etc.) in conjunction with pages, forms and other information provided by System 16 or other systems or servers. As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and at least a portion its components are operator configurable using applications, such as a browser, including computer code run using a central processing unit such as an Intel Pentium® processor or the like. Similarly, System 16 (and additional instances of MTS's, where more than one is present) and all of their components might be operator configurable using application(s) including computer code run using a central processing unit such as an Intel Pentium® processor or the like, or multiple processor units. Computer code for operating and configuring System 16 to intercommunicate and to process web pages and other data and content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java™, JavaScript, any other scripting language, such as VBScript and many other programming languages as are well known. (Java™ is a trademark of Sun Microsystems, Inc.).

According to one embodiment, System 16 is configured to provide web pages, forms, data, such as answers to queries, and other content to user systems 12 to support the access by user systems 12 of System 16. As such, System 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). Each MTS may include one or more logically and/or physically connected servers distributed locally or across a number of disparate geographic locations. Additionally, the term "server" is meant to include a computer system, including processing hardware and process space(s), and an associated storage system and database application (e.g., RDBMS) as is well known in the art. It should also be understood that "server system" and "server" are often used interchangeably in the art and herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2A:
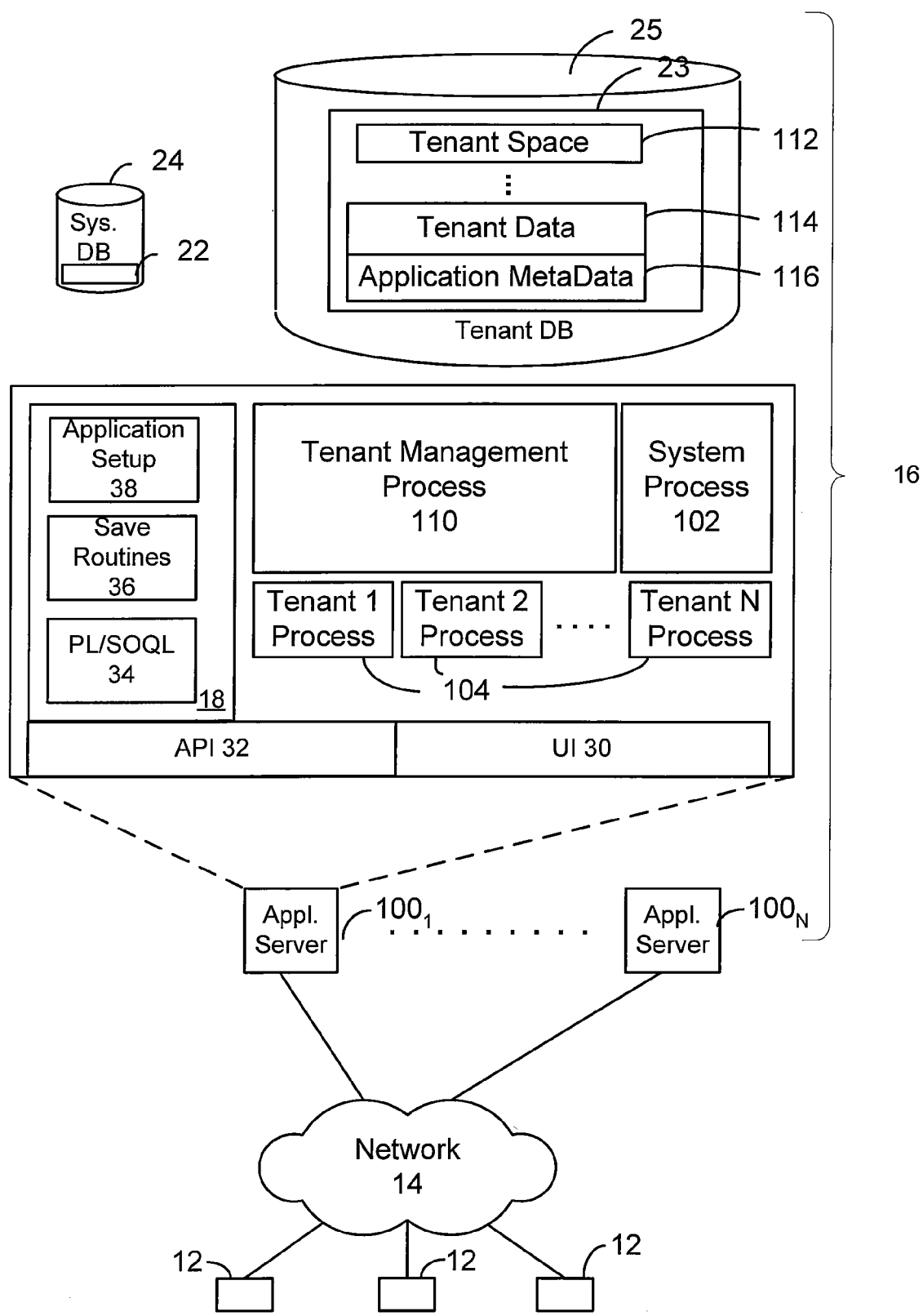
FIGS. 2A-2B illustrate elements of a multi-tenant database system and various interconnections thereof according to one embodiment.

FIG. 2A illustrates elements of System 16 and various interconnections in an embodiment. As shown by FIG. 2A, example System 16 includes a network interface 20 (of FIG. 1) implemented as a set of HTTP application servers 100, an application platform 18 and database objects 22, 24. Also shown is system process space 102, including individual tenant process spaces 104 and a tenant management process space 110. Each application server 100 may be configured to access storage 22 and the tenant data therein, and access storage 24 and the system data therein to serve requests of user systems 12. The tenant data 23 might be divided into individual tenant storage areas 112, which can be either a physical arrangement or a logical arrangement of data. Within each tenant storage area 112, user storage 114 and application storage 116 might be similarly allocated for each user. For example, a copy of a user's most recently used (MRU) items might be stored to user storage area 114. Similarly, a copy of MRU items for an entire organization that is a tenant might be stored to tenant storage area 112. A user interface UI 30 provides a user interface and an API 32 provides an application programmer interface to System 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant database 22 by save routines 36 for execution by subscribers as one or more tenant processes 104 managed by tenant management process 110 for example. Invocations to such applications may be coded using PL/SOQL 34 that provides a programming language style interface extension to API 32. Invocations to applications may be detected by one or more system processes, which manage retrieving application metadata 116 for the subscriber making the invocation and executing the metadata as an application in a virtual machine.

Each application server 100 may be communicatively coupled to storage 23 and 25 via different types of network connections. For example, one server 100₁ might be coupled to storage 23 and 25 via the Internet 14, another server 100₂ might be coupled via a direct network link, and another server 100₃ might be coupled by yet a different network connection. Transfer Control Protocol and Internet Protocol (TCP/IP) is one set of protocols for communicating between servers 100 and storage 23 and 25. However, it will be apparent to one skilled in the art that other transport protocols may be used to optimize the system depending on the network interconnect used.

According to one embodiment, each application server 100 is configured to permit the user systems 12 to access System 16 and to receive requests for a user issued via the user's user system 12. Because it is desirable to be able to add and remove application servers from the server pool at any time for any reason, there is preferably no server affinity for a user to a specific application server 100. In one embodiment, therefore, an interface system (not shown) implementing a load balancing function (e.g., an F5 Big-IP load balancer) is communicably coupled between the application servers 100 and the user systems 12 to distribute requests to the application servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers 100, and three requests from different users could hit the same server 100. In this manner, System 16 is multi-tenant, wherein System 16 handles storage of, and access to, different objects, data and applications across disparate users and organizations.

According to one embodiment, user systems 12 communicate with application servers 100 to thereby interact with System 16 to retrieve data, update the system data, update the tenant data, run an application and the like. A user system may issue a request 122 to an application server 100 to execute any of the foregoing transactions with System 16. Each application server may be configured to permit a plurality of user systems to access (e.g., log into) the application server to submit request to System 16.

Request Management of User Requests

Figure 2B:
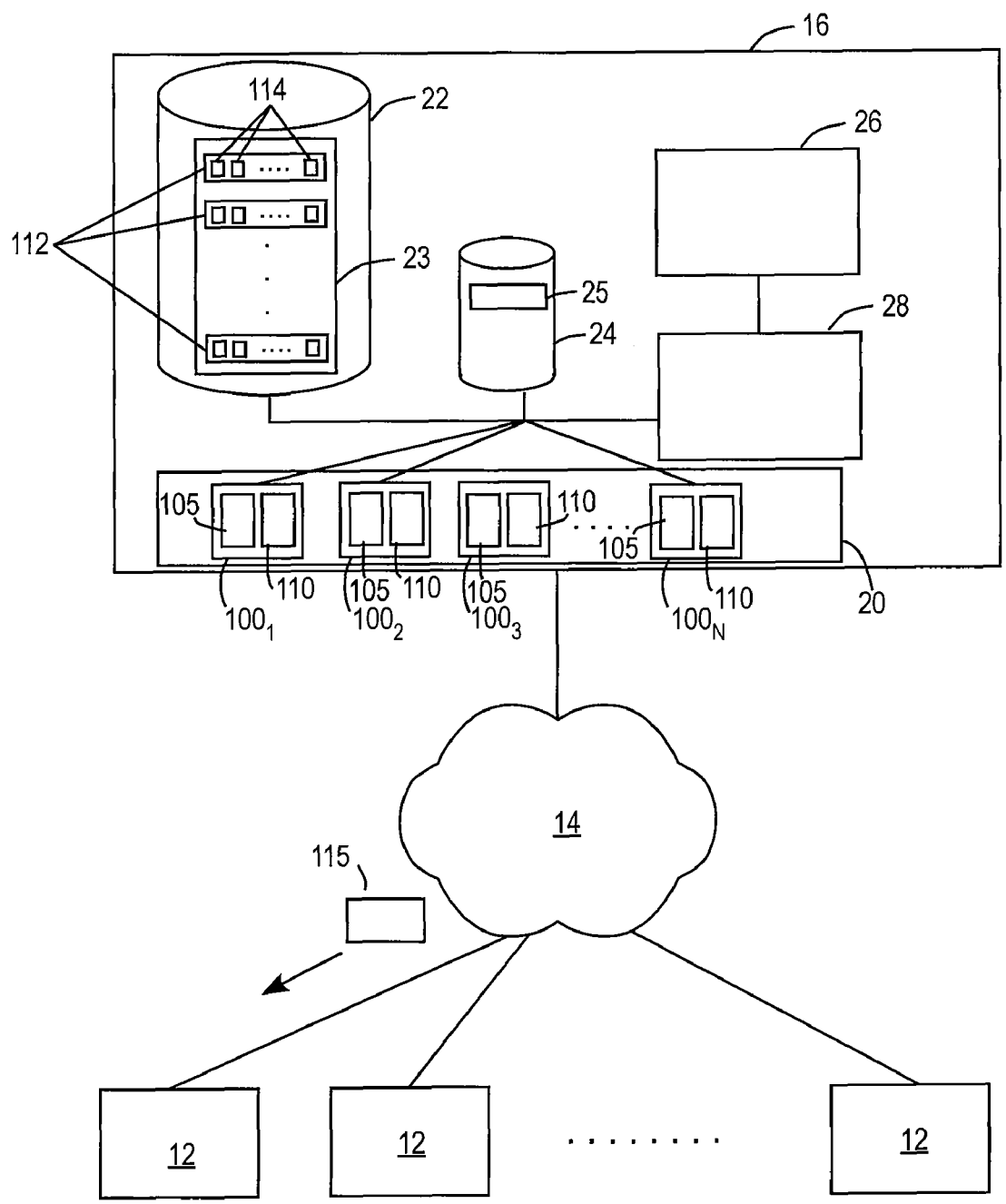

Now with reference to FIG. 2B, according to one embodiment, each application server 100 is configured to track the total number of requests (or "total requests"), over a given period of time, that each user system issues to the application server for System 16. The given period of time may be thirty minutes or longer. Each application server may track the total request for each tenant, which may have one or more users issuing request to the application server via the users' user systems. In addition to tracking the total number of request issued in a given period of time, an application server may track a variety of metadata that is associated with the requests. The metadata may include information for the nature of the request. For example, different requests may require different amounts of database access. An amount of database access may be based on data volume access, a number of row or columns, a time period of access, or a combination of the foregoing. The application server may be configured to track the metadata to determine an amount of database access that is associated with the requests.

Each application server may include a local store 105 that is configured to store the total number of requests for each tenant for the given period of time. Each local store may also be configured to store the metadata for the requests that are received by the application server associated with the local store. This information for the total requests might be organized by tenant in the local store. Each local store may also be configured to store the metadata for the total requests that are received the application server associated with the local store. The local stores may be configured to organize the metadata on a per tenant basis.

Each application server 100 may also be configured to track the number of current requests that have been issued by a set of user systems currently accessing the application server. A current request is a request that is being processed at a given instant of time. The application server may track the number of current requests for each tenant, which may have one or more users that are issuing request to the application server via the users' user systems. In addition to tracking the number of current request, the application server may track a variety of metadata that is associated with the current requests. The application server may be configured to store the number of current requests in the local store, and may store the metadata for the current requests in the local.

According to one embodiment, each application server 100 is configured to transfer the number of total requests, the number of current requests, the metadata for the total requests, and/or the metadata for the current requests to the set of processors 28 of System 16. The set of processors may be configured to accumulate the number of total requests and/or the number of current requests received from each application server for each tenant on a per tenant basis. The set of processors may also be configured to accumulate the metadata for the total requests and/or the current requests for each tenant on a per tenant basis. The set of processors 28 may be configured to send to each application server 100 the accumulated number of total requests and/or the accumulated number of current requests for all or a subset of the application servers. For example, if application server $100_1$ has received 15 total requests and 10 current requests, but application servers $100_2$-$100_N$ have cumulatively received 45 total requests and 32 current requests, then application server $100_1$ may be informed by the set of processors of the 55 total request and 47 current request received by all of the application servers $100_1$-$100_N$. Alternatively, the set of processors may be configured to send back to each application server the number of total requests and current requests received by each of the other application servers. For example, if application server $100_1$ has received 15 total requests and 10 current requests, but application servers $100_2$-$100_N$ have cumulatively received 45 total requests and 32 current requests, then application server $100_1$ may be informed by the set of processors of the 45 total request and 32 current request received by the other application servers $100_2$-$100_N$. The set of processors may also be configured to send to the application servers the accumulated metadata for the total requests and/or the current requests for all or some of the application servers.

Each application sever may include a global store 110 that is configured to store the number of total requests and the number of current requests received by the set of processors 28. The global store may also be configured to store the accumulated metadata for the total request and/or the current requests. A global store may be a portion of its associated local store, or may be an independent store. A global store and a local store are associated with the local store and the global store comprise a portion of the same application server.

According to one embodiment, each tenant may be associated with a threshold number of total requests and a threshold number of current requests. The threshold number of total requests and the threshold number of current requests associated with a tenant may be associated with the tenant's status. For example, a tenant that is a paying subscriber of System 16 may be assigned higher threshold numbers of total requests and current requests than a non-paying user of System 16.

For each tenant, each application server may be configured to compare the number of total requests for the tenant with the threshold number of total requests for the tenant. The number of total request might include: (i) the number of total requests in store 105 plus the number of total request stored in store 110 (referred to as option one), (ii) the number of total requests stored in store 110 (referred to as option two), or (iii) the number of total request stored in store 105 (referred to as option three). A given application server might make the foregoing described comparison based on option one if the set of processors 28 of System 16 sends to the given application server the number of total requests received by the other application servers. The given application server might make the foregoing described comparison based on option two if the set of processors sends to the given application server the number of total requests received by the given application server and the other application servers. The given application server might make the foregoing described comparison based on option three if the given application server is unable to collect from the set of processors the number of total request received by the other application servers. For example, if one or more networks that couple the other application servers the set of processors fail, and the set of processors is unable to collect the number of total requests received by the other application servers, then the given application server might make a comparison based on option three.

If a given application server determines (based on comparison option one, two, or three) that the number of total requests for a given tenant exceeds the threshold number of total requests for the given tenant, then the given application server may be configured to take one or more actions. For example, if the number of total requests exceeds the threshold number of total requests, then the given application server may be configured to send a message 115 to each of the given tenant's user systems that are in communication with (e.g., issuing requests) the given application server. The message might be a warning that the tenant has exceeded the tenant's total request limit. Alternatively, if the number of total request exceeds the threshold number of total requests, then the given application server may be configured to refuse further requests from the user systems of the given tenant, and my send message 115 to indicate the reason for refusing the tenant's further requests. The various actions taken by the given application server might further be based on a tenant's status. For example, a paying tenant may receive a number of messages before the application servers refuse the tenant's request, whereas the application servers for a non-paying tenant may or may not receive a message before the application servers refuse the tenants request.

For each tenant, each application server may be configured to compare the number of current requests for the tenant with the threshold number of current requests for the tenant. The number of current request might include: (i) the number of current requests in store 105 plus the number of current request stored in store 110 (referred to as option four), (ii) the number of current requests in store 110 (referred to as option five), or (iii) the number of current request stored in store 105 (referred to as option six). A given application server might make the foregoing described comparison based on option four if the set of processors 28 sends to the given application server the number of current requests received by the other application servers. The given application server might make the foregoing described comparison based on option five if the set of processors sends to the given application server the number of current requests received by the given application server and the other application servers. The given application server might make the foregoing described comparison based on option six if the given application server is unable to collect from the set of processors the number of current request received by the other application servers. For example, if one or more networks that couple the other application servers to the set of processors fails, and the set of processors is unable to collect the number of current requests received by the other application servers, then the given application server might make a comparison based on option six.

If a given application server determines (based on comparison option four, five, or six) that the number of current requests for a given tenant exceeds the threshold number of current requests for the given tenant, then the given application server may be configured to take one or more of a variety of actions. For example, if the number of current requests exceeds the threshold number of current requests, then the given application server may be configured to send message 115 to each of the given tenant's user systems that are in communication with (e.g., logged into) the given application server. The message might be a warning that the tenant has exceeded the tenant's current request limit. Alternatively, if the number of current request exceeds the threshold number of current requests, then the given application server may be configured to refuse further requests from the user systems of the tenant, and my send message 115 to indicate the reason for refusing the tenant's further requests. These various actions taken by the given application server might further be based on that tenant's status (e.g., paying vs. non-paying tenant). Monitoring a tenant's total requests and current requests, and limiting the number of total requests and/or current request and/or providing a warning to the tenant of over usage provides that System 16 does not become overloaded with requests, such as in an unpredictable manner.

According to another embodiment, for a given tenant, each application server is configured to analyze the metadata stored in the local store (e.g., if the network is not operating properly) and/or the global store. Each application server may be configured to determine an amount of database access based on the metadata stored in the application server's local store and/or global store. If the amount of database access exceeds a threshold amount a database access for the given tenant, then the application sever is configured to send a message to the user systems as described above and/or stop accepting requests issued by the given tenant's user systems.

Figure 3:
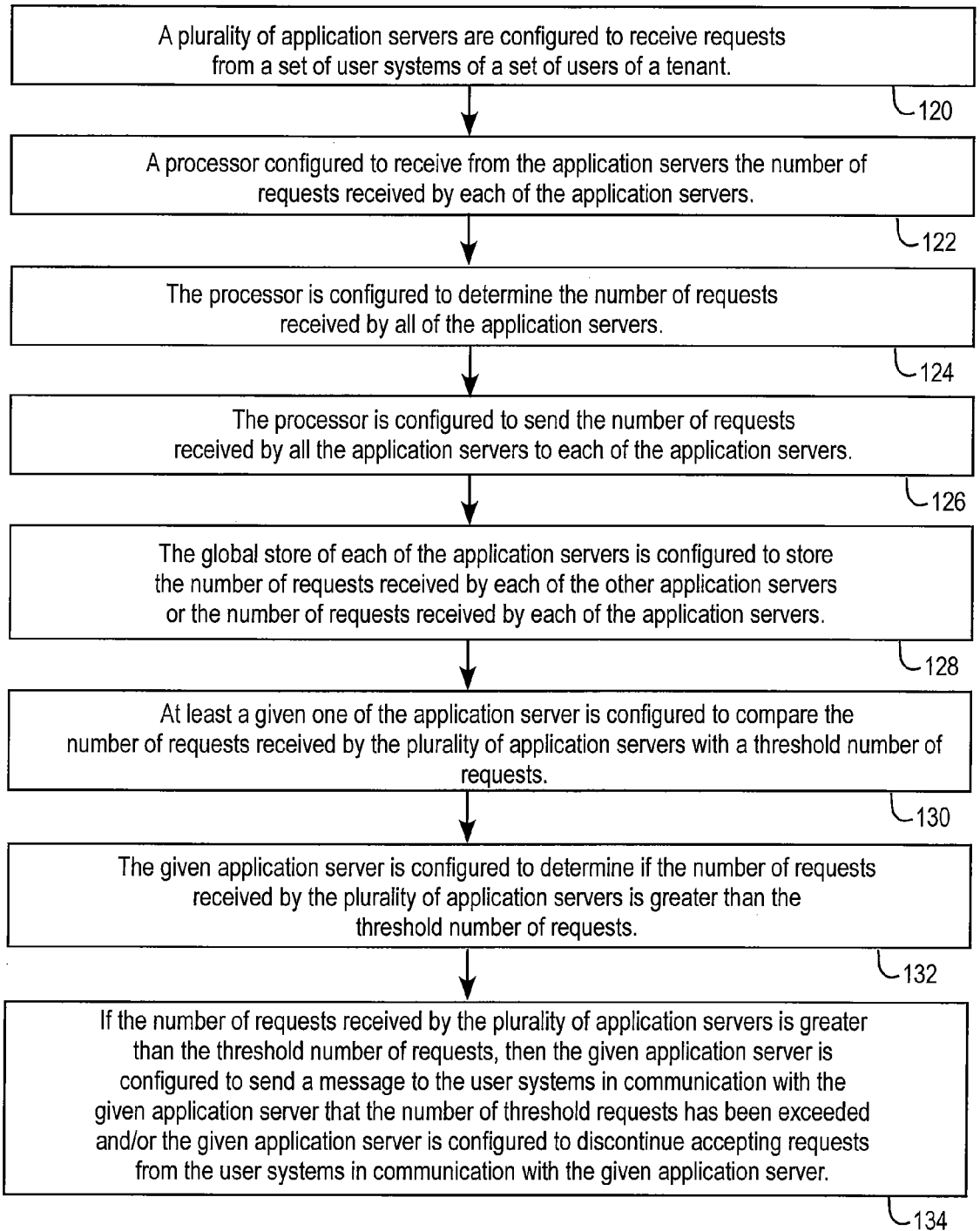
FIG. 3 is a high-level flow chart describing an example of monitoring and potentially limiting access to the MTS by user systems according to one embodiment.

FIG. 3 is a high-level flow chart describing an example of monitoring and potentially limiting access to System 16 by user systems according to one embodiment. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims. At 120, a plurality of application servers are configured to receive requests from a set of user systems of a set of users of a tenant. Each of the local stores of each application server is configured to store the number of requests received by the application server associated with the local store. At 122, a processor configured to receive from the application servers the number of requests received by each of the application servers. At 124, the processor is configured to determine the number of requests received by all of the application servers. At 126 the processor is configured to send the number of requests received by all the application servers to each of the application servers. At 128, the global store of each of the application servers is configured to store the number of requests received by each of the other application servers or the number of requests received by each of the application servers. At 130 at least a given one of the application server is configured to compare the number of requests received by the plurality of application servers with a threshold number of requests. At 132 the given application server is configured to determine if the number of requests received by the plurality of application servers is greater than the threshold number of requests. At 134, if the number of requests received by the plurality of application servers is greater than the threshold number of requests, then the given application server is configured to send a message to the user systems in communication with the given application server that the number of threshold requests has been exceeded and/or the given application server is configured to discontinue accepting requests from the user systems in communication with the given application server.

Request Management via Applied Filtering

According to another embodiment, the set of processors 28 of System 16 and/or application servers 100 are also configured to apply a variety of filters to a user's requests to increase the efficiency the request. A request issued by a user via the user's user system may be broader or narrower than user might actually desire. If a request is broader than the user might desire, then unnecessary processing by System 16 is consumed by the request. If a request is narrower than desired, the user might not be satisfied with the results of the request and might issue another request, which would similarly consume unnecessary processing by System 16. Processing time and database access of System 16 tends to be costly and using System 16 in a relatively efficient manner tends to save money and permits the MTS accept and respond to the requests of a larger number of tenants.

According to one embodiment, a request might be filtered "geographically." For example, if a user issues a request for data or the like, and the user's interests are limited to a particular geographical region, then a "geographical" filter is applied to the request that limits the request to data associated with the particular geographical region. For example, a salesperson working in California might issue a request via the salespersons user system for sales data for a product. The request of the salesperson might be overly broad and might be for sales data for states and/or counties in which the given product is sold. However, it may be known by System 16 that the salesperson sells the product in California, and System 16 and/or the application server that the user system is accessing may apply a geographic filter to the request that limits the request for sale data for California.

According to another embodiment, a "data volume" filter is applied to a request. A data volume filter may be configured to limit the amount a data that a request might be allowed to access. For example, a database may be organized as a two dimensional database of rows and columns (i.e., a flat database).

Figure 4:
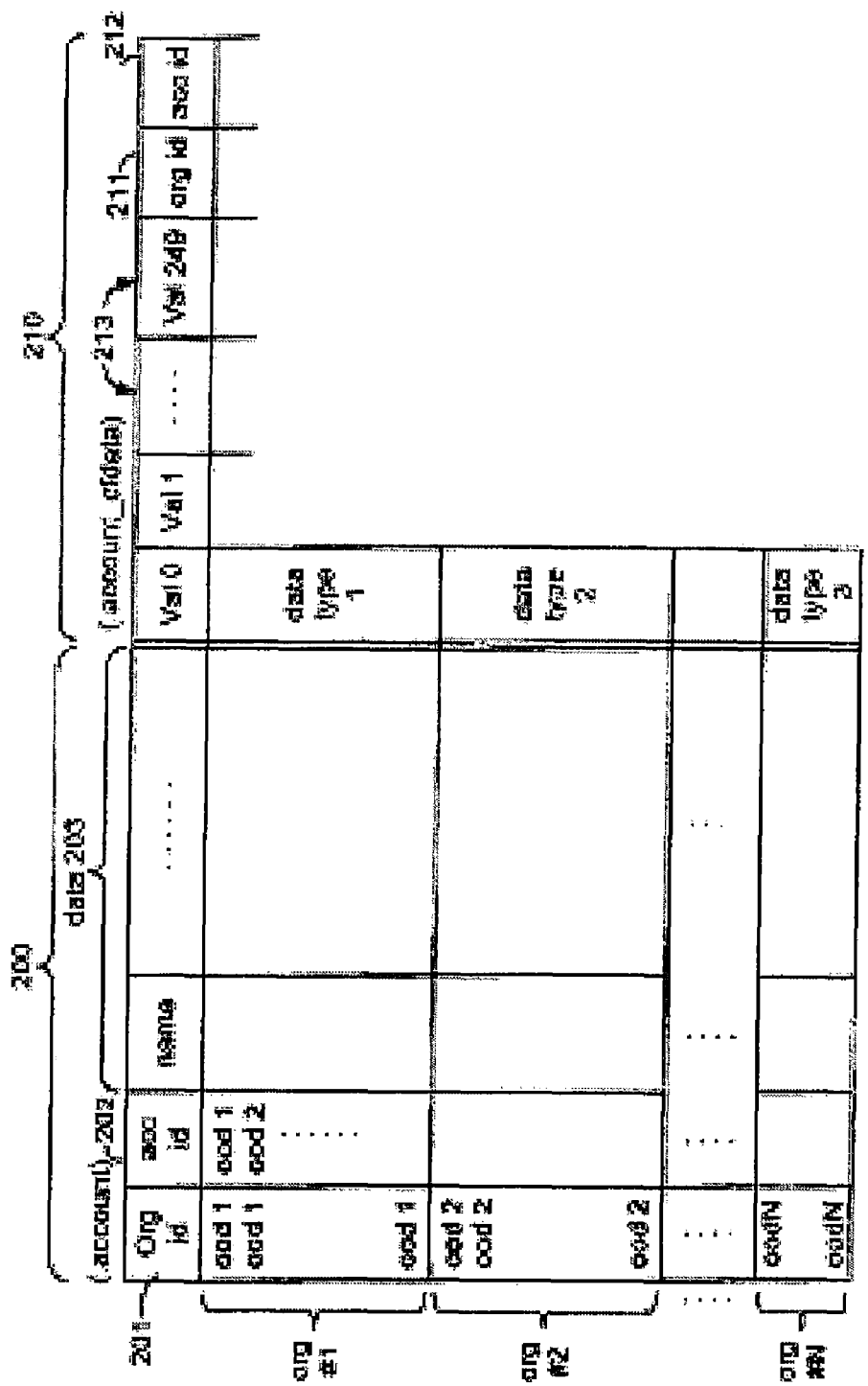
FIG. 4 is a simplified schematic of flat database table and an associated custom field table according to one embodiment.

FIG. 4 is a simplified schematic of flat database table 200 and an associated custom field table 210 according to one embodiment. In the specific example shown in FIG. 4, the main table 200 represents a standard "account" entity and the custom field table 210 includes the custom fields defined by the various tenants using the main table 200. As shown, main table 200 includes an organization identification (ID) column 201 and a table ID column 202 that acts as the primary key for table 200. Data table 200 also includes a plurality of data columns 203. Custom field table 210 similarly includes an organization ID column 211, a table ID column 212, and plurality of data columns 213. It should be understood that the database tables of FIG. 4 are exemplary, and the filter embodiments described herein may be configured to filter requests associated with these database tables or other database tables.

According to one embodiment, if a tenant's user issues a request via the user's user system where the request is for data on the database, for example, and the request is configured to access a number of rows that exceeds a threshold number of rows, then the a data volume filter might be applied to the request to limit the number of rows that the request will be permitted to access. The threshold number of rows might be different for different tenants and for different users of a given tenant. For example, the threshold number of accessible rows for a chief executive officer of a tenant may be higher than the threshold number of rows for a middle manager of the tenant. A data volume filter might similarly be applied to the number of columns a user's request might be permitted to access. Data volume filters might be applied to more complex database structures, such as three or higher dimension databases. A data volume filter might also be applied to a request based on a data byte basis.

According to another embodiment, a "semantic" filter is applied to a request. A semantic filter may modify a search string in a request, modify a user's semantic search filter in a request or the like. If, for example, a search sting includes one or more words, the semantic filter may modify a word, add a word, or remove a word from the search string to make the search of System 16 relatively more efficient. A word might be modified by stemming the word (e.g., removing one or more suffices and/or prefixes to "cut" the word down to its base word), for example.

Figure 5:
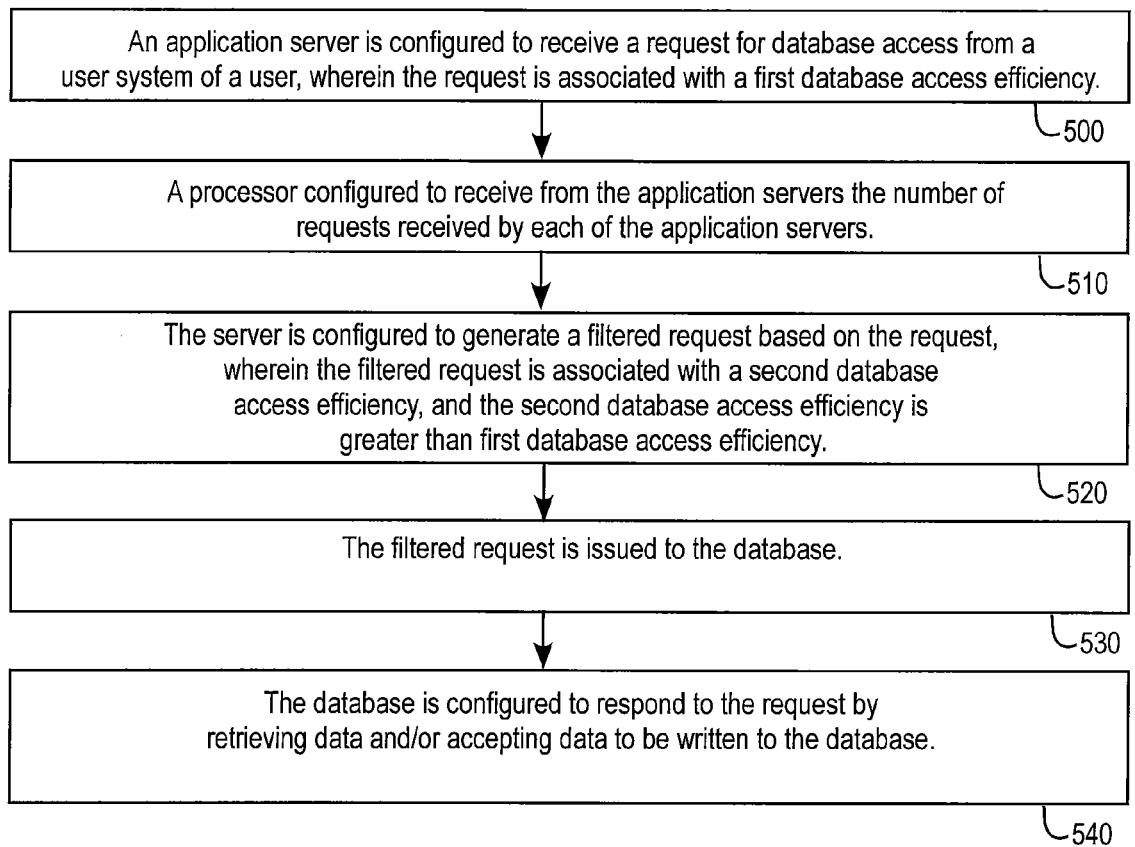
FIG. 5 is a high-level flow chart describing an example of monitoring and potentially limiting access to the MTS by user systems according to another embodiment.

FIG. 5 is a high-level flow chart describing an example of monitoring and potentially limiting access to System 16 by user systems according to another embodiment. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims. At 500, an application server is configured to receive a request for database access from a user system of a user. The request is associated with a first database access efficiency. A database access efficiency may be associated with an amount of data to be retrieved from or written to the database, a number of database rows and/or columns to be accessed (read and/or written), an amount of time over which data is to be accessed or a combination of the foregoing. At 510, the server is configured to generate a filtered request based on the request. The filtered request is associated with a second database access efficiency. The second database access efficiency is greater than first database access efficiency. At 520, the filtered request is issued to the database. At 530, the database is configured to respond to the request by retrieving data and/or accepting data to be written to the database.

Request Management of User Code Running on the MTS

Referring again to FIG. 2A, at least a portion of application metadata 116 may include code that may be generated by a user of a tenant, for example, according to one embodiment. Such user generated code may be transferred to System 16 (e.g., to one of the application servers 100) from a user system via the Internet or the like. A user, via the user's user system, can generate this code, transfer the code to System 16 for storage as metadata 116 and ultimately for execution. User generated code may be transmitted in one or more languages that are transferable over the Internet. For example, code may be transmitted to System 16 in xml (extensible markup language) or the like. The code may be interpreted by an interpreter on System 16 (e.g., an application server 100) during execution on System 16 (e.g., an application server 100) at the request of a user system. In an embodiment, the code may be implemented using a procedural extension scripting language that is referred to herein as PL/SOQL 34. For a detailed description of PL/SOQL, reference may be had to a commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006; which is incorporated in this specification in its entirety for all purposes.

According to one embodiment, the code may be configured to access one or more databases of System 16. For example, the code may be configured to request data from the database, make one or more calculations based on the retrieved data, and then update the database based on the calculations. The results of the code execution may be transferred to the user system in an xml message or the like. The code may also be configured to request database updates. For example, the code may be configured to make write requests to update one or more rows or columns of the database, such as the flat type of database table shown in FIG. 3. The code might be configured to request such updates be run in a batch process or the like.

According to one embodiment, as the code is run on System 16, the code is monitored by System 16 (e.g., by an application server 100) to determine an amount of database access the code requests (e.g., how often and/or how much of the database of System 16 is accessed at the request of the code). Determining how often and/or how much of the database is accessed might include monitoring the number of times the database if read from and/or written to. Determining how often and/or how much the database is accessed might also include monitoring the number of rows and/or columns of the database that are accessed per database request (or request) issued by the code. For example, System 16 may be configured to run a counter as the code executes to count the number of rows and/or columns that are accessed per request issued by the MTS may be configured to take one or more actions if a request issued by the code attempts to access a number of rows and/or a number of columns that respectively exceed a threshold number of rows and/or exceeds a threshold number of columns per request. System 16 might also include a counter to count and track the looping structure of the code, and the number of database requests in looping structure. MTS may be configured to take one or more actions if the number of database requests exceeds a number of threshold database requests.

According to one embodiment, the threshold number of rows, the threshold number of columns, and/or the number of database requests may be different based on one or more usage metrics. For example, if the code is configured to interact with a user interface on the user system, then the threshold number of rows, the threshold number of columns, and/or the threshold number of database requests may be relatively low. For example, the threshold number of rows and/or the threshold number of columns might be 500, 1000, 10,000 or the like. The threshold number of database requests that the code may issue may be one per click. That is, the code may not be permitted to issue more than one database request each time a user selects a screen option, such as a screen button on the user interface that is displayed on the user system. If the code is configured to run as a batch process (e.g., running on off peak running time of System 16) then the threshold number of rows, the threshold number of columns, and/or the number of database requests may be relatively high. For example, the threshold number of rows and/or the threshold number of columns for the latter example might be 50,000, 100,000, 1,000,000 or the like. The threshold number of rows, the threshold number of columns, and/or the number of database requests may be different for different users, such as a CEO, a middle manager or the like. If the threshold number of rows, the threshold number of columns, and/or the threshold number of database requests is exceeded, System 16 may be configured to take one or more actions.

Actions that System 16 may be configured to take include stopping execution of the code and/or sending a message to the user via the user's user system. If the user is a programmer who is developing the code (e.g., debugging the code), the message might include detailed data related to the running of the code on System 16. The data might include core setting of System 16 related to the code's execution on System 16. If the user is not a programmer, but is a user who is intended to run the code via a user interface, the message might include a relatively simpler message with out the core setting information. The message might indicate that the user has attempted to access more data than is permitted by the user. The message might include suggestions for the user to continue with the user's work but in a manner that does not exceed the thresholds associated with the given user.

Figure 6:
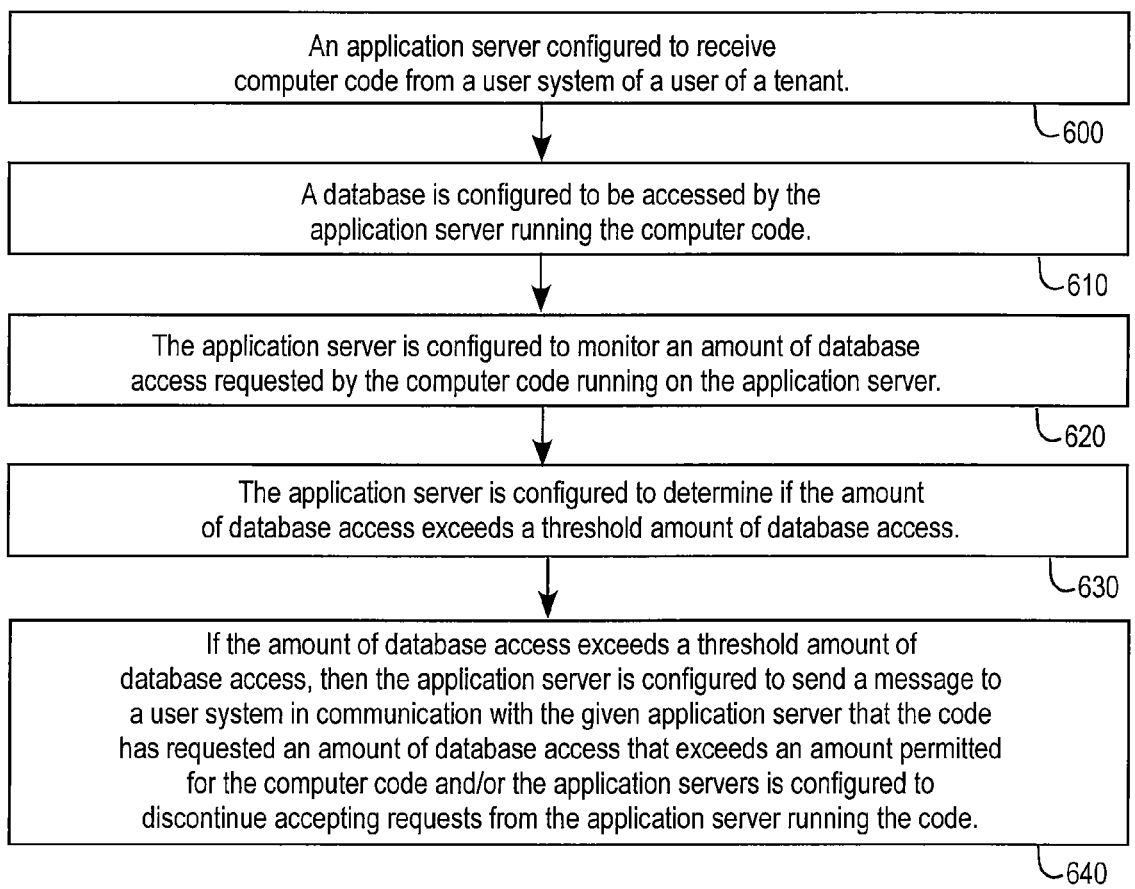
FIG. 6 is a high-level flow chart describing an example of monitoring and potentially limiting access to the MTS by user systems according to another embodiment.

FIG. 6 is a high-level flow chart describing an example of monitoring and potentially limiting access to System 16 by user systems according to another embodiment. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims. At 600, an application server configured to receive computer code from a user system of a user of a tenant. The computer code is received in a format that is transportable over a network. At 610, the application server is configured to compile and run the computer code. At 620, a database is configured to be accessed by the application server running the computer code. At 630, the application server is configured to monitor an amount of database access requested by the computer code running on the application server. At 640, the application server is configured to determine if the amount of database access exceeds a threshold amount of database access. At 650, if the amount of database access exceeds a threshold amount of database access, then the application server is configured to send a message to a user system in communication with the given application server that the code has requested an amount of database access that exceeds an amount permitted for the computer code and/or the application servers is configured to discontinue accepting requests from the application server running the code.

Further embodiments can be envisioned to one of ordinary skill in the art after reading this disclosure. In other embodiments, combinations or sub-combinations of the above disclosed invention can be advantageously made. The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. A multi-tenant database system comprises:
   a plurality of application servers configured to receive requests from a set of user systems of a set of users of a given tenant, wherein each of the application servers includes a local store and a global store, and each of the local stores is configured to store the number of requests received by the application server associated with the local store for the given tenant; and
   a processor configured to receive from the application servers the number of requests received by each of the application servers for the given tenant; and
   a network configured to communicatively couple the application servers and the processor, wherein:
      the processor is configured to determine the a total number of requests received by all of the application servers for the given tenant, and send the total number of requests received by all the application servers to each of the application servers,
      the global store of each of the application servers is configured to store the number of requests received by each of the other application servers for the given tenant or the number of requests received by each of the application servers for the given tenant,
      at least a given one of the plurality of application servers is configured to compare the total number of requests received by the plurality of application servers with a threshold number of requests associated with the given tenant, and when the total number of requests received by the plurality of application servers is greater than the threshold number of requests, then the given application server is configured to perform at least one of sending messages to the user systems in communication with the given application server for the given tenant that the threshold number of threshold requests has been exceeded, and discontinuing accepting requests from the user systems in communication with the given application server for the given tenant;
      when the network fails between the given application server and the processor, then the given application server is configured to compare the number of requests received that is stored in the given application server's local store with the threshold number of requests, and when the number of requests received by the given application server is greater than the threshold number of requests, then the given application server is configured to perform at least one of sending messages to the user systems in communication with the given application server for the given tenant that the threshold number of threshold requests has been exceeded, and discontinuing accepting requests from the user systems in communication with the given application server for the given tenant.

2. The system of claim 1, wherein the number of requests is for requests received over a period of time.

3. The system of claim 1, wherein the period of time is thirty minutes or longer.

4. The system of claim 1, wherein the number of requests is for current requests that are pending.

5. The system of claim 1, wherein the number of requests includes the number of requests received over a period of time and includes the number of current requests that is pending.

6. The multi-tenant database system of claim 1, further comprising a load balancer operable to distribute the requests to the application servers.

7. The multi-tenant database system of claim 1, wherein the set of users corresponds with at least one of capacities applicable to users of a given tenant.

8. The multi-tenant database system of claim 1, wherein the set of user systems corresponds with at least one of a capacities applicable to user systems corresponding to a given tenant.

9. The multi-tenant database system of claim 1, wherein the threshold applicable to a user corresponds with a capacity of the user.

10. The multi-tenant database system of claim 1, wherein capacities of at least one of the set of users and the set of user systems corresponds with a hierarchical role model.

11. An operation method of multi-tenant database system comprises:
    receiving at a plurality of application servers requests from a set of user systems of a set of users of a given tenant, wherein each of the application servers includes a local store and a global store;

storing a number of requests received by each application server for a given tenant in a local store of each application server associated with the local store;

transferring the number of requests received by each application server for a given tenant to a processor;

determining in the processor the a total number of requests received by all of the application servers for the given tenant;

sending the total number of requests received by all the application servers to each of the application servers;

storing in a global store of each of the application servers the number of requests received by each of the other application servers for the given tenant or the number of requests received by each of the application servers for the given tenant;

comparing in a given one of the application servers the total number of requests received by the plurality of application servers with a threshold number of requests;

when the total number of requests received by the plurality of application servers is greater than the threshold number of requests, performing at least one of sending from the given application server to the user systems in communication with the given application server for a given tenant a message that indicates that the threshold number of threshold requests has been exceeded and discontinuing accepting requests from the user systems in communication with the given application server for the given tenant;

when a network connection between the application servers and the processor fails, comparing in the given application server the number of requests received that is stored in the given application server's local store with the threshold number of requests; and when the number of requests received that is stored in local store of the given application server is greater than the threshold number of requests, performing at least one of sending a message from the given application to the user systems in communication with the given application server for the given tenant that the threshold number of threshold requests has been exceeded and discontinuing the acceptance requests from the user systems in communication with the given application server for the given tenant.

12. A multi-tenant database system comprises:

a plurality of application servers configured to receive requests from a set of user systems of a set of users of a given tenant, wherein each of the application servers includes a local store and a global store, each of the local stores is configured to store metadata for the requests from the given tenant, and the metadata for each request represents an amount of database access associated with the request for the given tenant; and a processor configured to receive from the application servers the metadata for the requests for the given tenant, wherein:

a processor configured to receive from the application servers the metadata for the requests for the given tenant; and a network configured to communicatively couple the application servers and the processor, wherein:

the processor is configured to accumulate the metadata for the given tenant and send the accumulated metadata to each of the application servers, the global store of each of the application servers is configured to store metadata received from the processor for the given tenant, at least one of the application servers is configured to determine from the received metadata an amount of database access for the given tenant and compare the amount of database access to a threshold amount of database access for the given tenant, when the amount of database access associated with the received metadata for the given tenant exceeds a threshold amount of database access, then the given application server is configured to perform at least one of sending a message to the user systems in communication with the given application server for the given tenant that the user systems have requested an amount of database access that exceeds an amount permitted for the tenant and discontinuing accepting requests from the user systems in communication with the application server for the given tenant;

when the network fails between the given application server and the processor, then the given application server is configured to determine from the metadata in the local store of the given application server for the given tenant another amount of database access, and when the other amount of database access for the given tenant exceeds a threshold amount of database access for the given tenant, then the given application server is configured to perform at least one of sending a message to the user systems in communication with the given application server for the given tenant that these user systems have requested an amount of database access that exceeds an amount permitted for the given tenant and discontinuing accepting requests from these user systems in communication with the application server for the given tenant.

* * * * *